(12) United States Patent
Schäffer et al.

(10) Patent No.: US 6,649,902 B2
(45) Date of Patent: Nov. 18, 2003

(54) SUMMING THE OUTPUT OF AN ARRAY OF OPTICAL DETECTOR SEGMENTS IN AN ATOMIC FORCE MICROSCOPE

(75) Inventors: Tilman Schäffer, Santa Barbara, CA (US); Paul K. Hansma, Isla Vista, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/165,503

(22) Filed: Jun. 7, 2002

(65) Prior Publication Data

US 2002/0195553 A1 Dec. 26, 2002

Related U.S. Application Data

(62) Division of application No. 09/166,979, filed on Oct. 6, 1998.

(51) Int. Cl.⁷ .................................................. H01J 5/16
(52) U.S. Cl. .................................... 250/216; 250/214 A
(58) Field of Search ........................... 250/216, 234, 250/203.1, 203.2, 306, 307, 214 A, 208.1, 214 AG; 73/105

(56) References Cited

U.S. PATENT DOCUMENTS

| | | | |
|---|---|---|---|
| 4,776,698 A | 10/1988 | Crosdale | |
| 4,935,634 A | 6/1990 | Hansma et al. | 250/560 |
| 5,015,835 A * | 5/1991 | Ohuchida et al. | 250/201.5 |
| 5,045,696 A | 9/1991 | Hirose | 250/306 |
| 5,047,637 A | 9/1991 | Toda | 250/306 |
| 5,060,248 A | 10/1991 | Dumoulin | 378/53 |
| 5,081,354 A | 1/1992 | Ohhashi et al. | 250/311 |
| 5,117,111 A | 5/1992 | Nakamura et al. | 250/310 |
| 5,138,158 A | 8/1992 | Ninomiya et al. | 250/305 |
| 5,164,791 A | 11/1992 | Kubo et al. | 356/356 |
| 5,196,713 A | 3/1993 | Marshall | 250/561 |
| 5,200,616 A | 4/1993 | Kokowa et al. | 250/306 |
| 5,206,702 A | 4/1993 | Kato et al. | 356/358 |
| 5,214,282 A | 5/1993 | Yamaguchi et al. | 250/307 |
| 5,235,457 A | 8/1993 | Lichtman et al. | 359/368 |
| 5,247,186 A | 9/1993 | Toda | 250/561 |
| 5,260,824 A * | 11/1993 | Okada et al. | 359/368 |
| 5,291,775 A | 3/1994 | Gamble et al. | 73/105 |
| 5,298,975 A | 3/1994 | Khoury et al. | 356/375 |
| 5,315,373 A | 5/1994 | Kubo et al. | 356/373 |
| 5,317,153 A | 5/1994 | Matsushiro et al. | 250/306 |
| 5,333,495 A | 8/1994 | Yamaguchi et al. | 73/105 |
| 5,334,830 A | 8/1994 | Fukuyama et al. | 250/216 |
| 5,360,977 A | 11/1994 | Onuki et al. | 250/306 |
| 5,406,832 A | 4/1995 | Gamble et al. | 73/105 |
| 5,406,833 A | 4/1995 | Yamamoto | 73/105 |
| 5,440,920 A | 8/1995 | Jung et al. | 73/105 |
| 5,441,343 A | 8/1995 | Pylkki et al. | 374/137 |
| 5,473,157 A | 12/1995 | Grober et al. | 250/234 |
| 5,481,908 A | 1/1996 | Gamble | 73/105 |
| 5,496,999 A | 3/1996 | Linker et al. | 250/306 |
| 5,507,179 A | 4/1996 | Gamble et al. | 73/105 |

(List continued on next page.)

OTHER PUBLICATIONS

M. Hipp, H. Bielefeldt, J, Colchero, O. Marti and J. Mlynek, "*A Standalone Scanning Force and Friction Microscope*"; Ultramicroscopy, 42–44, 1498 (1992).

(List continued on next page.)

*Primary Examiner*—Thanh X. Luu
(74) *Attorney, Agent, or Firm*—Fulbright & Jaworski (57) ABSTRACT

A high sensitivity beam deflection sensing optical device, such as an atomic force microscope, including one or more of the following: specified means in the path of the incident beam for adjusting the size and/or power of the incident beam spot, means for moving the incident beam spot with movement of the object whereby to maintain the position of the spot on the object, and means for increasing the signal to noise ratio of the optical detector in which adjusted gains are applied to different segments of the optical detector.

4 Claims, 11 Drawing Sheets

U.S. PATENT DOCUMENTS

| | | | |
|---|---|---|---|
| 5,508,517 A | 4/1996 | Onuki et al. | 250/306 |
| 5,524,479 A | 6/1996 | Harp et al. | 73/105 |
| 5,557,156 A | 9/1996 | Elings | 310/316 |
| 5,560,244 A | 10/1996 | Prater et al. | 73/105 |
| 5,581,082 A | 12/1996 | Hansma et al. | 250/306 |
| 5,581,352 A | 12/1996 | Zeien | 356/376 |
| 5,587,523 A | 12/1996 | Jung et al. | 73/105 |
| 5,616,916 A | 4/1997 | Handa et al. | 250/234 |
| 5,625,142 A | 4/1997 | Gamble | 73/105 |
| 5,644,512 A | 7/1997 | Chernoff et al. | 364/571.02 |
| 5,650,614 A | 7/1997 | Yasutake et al. | 250/234 |
| 5,654,546 A | 8/1997 | Lindsay | 250/306 |
| 5,672,816 A | 9/1997 | Park et al. | |
| 5,680,387 A | 10/1997 | Yamano et al. | 369/126 |
| 5,681,987 A | 10/1997 | Gamble | 73/105 |
| 5,689,063 A | 11/1997 | Fujiu et al. | 73/105 |
| 5,805,467 A | 9/1998 | Richards | |
| 5,825,020 A | 10/1998 | Hansma et al. | |
| 5,889,750 A | 3/1999 | Summers et al. | |
| 5,918,305 A | 6/1999 | Livingston | |
| 5,939,709 A | 8/1999 | Ghislain et al. | |
| 5,952,562 A | 9/1999 | Yagi et al. | |
| 6,002,471 A | 12/1999 | Quake | |

OTHER PUBLICATIONS

M. Radmacher, K. Eberle and H.E. Gaub, "An AFM with Integrated Microfluorescence Optics: Design and Performance" Ultramicroscopy 42–44, 968 (1992).

C.A.J. Putman, B.G. de Grooth, N.F. Van Hulst and J. Greve, "A Theoretical Comparison Between Interferometric and Optical Beam Deflection Technique for the Measurement of Cantilever Displacement in AFM" Ultramicroscopy 42–44, 1509 (1992).

R. Erlandsson, G.M. McClelland, C.M. Mate and S. Chiang, "Atomic Force Microscopy Using Optical Interferometry" J. Vac. Sci. & Technol. A 6C2), 266 (1988).

S. Alexander, J. Schneir, O. Marti, L. Hellemans, V. Elings, P.K. Hansma, M. Longmier and J. Gurley, "AnAtomic Resolution AFM Implemented Using an Optical Lever" J. Appl. Phys. 65, 164 (1989).

B. Drake, C.B. Prater, A.L. Weisenhorn, S.A.C. Gould, T.R. Albrecht, C.F. Quate, D.S. Cannell, H.G. Hansma and P.K. Hansma, "Imaging Crystals, Polymers, Biological Processes in Water with the Atomic Force Microscope", Science 243, 1586 (1989).

S.M. Clark and J.D. Baldeschwieler, "A High Performance Scanning Force Microscope Head Design", Rev. Sci. Instrum., 64(4), 904 (1993).

D.R. Baselt and J.D. Baldeschwieler, "Scannedcantilever Atomic Force Microscope", Rev. Sci. Instrum. 64(4), 904 (1993).

G. Binning and C.F. Quate, "Atomic Force Microscope" Phys. Rev. Lett. 56, 930 (1986).

G. Meyer and N.M. Amer, "Novel Optical Approach to Atomic Force Microscopy"; Appl. Phys. Lett. 53, 1045 (1998).

Constant, A.J. Putman, B.G. De Grooth, N.F. Van Hulst, J. Greve, "A Detailed Analysis Of The Optical Beam Deflection Technique For Use In Atomic Force Microscopy" 1992 American Institute of Physics, p. 6.

M.G.L. Gustafsson and J. Clarke, "Scanning Force Microscope Springs Optimized for Optical–Beam Deflection and with Tips Made by Controlled Fracture", J. Appl. Phys. 76, 172 (1994).

S.R. Momalis, S.C. Minne, A. Atalar and C.F. Quate, "Interdigital Cantilevers for Atomic Force Microscope", Appl. Phys. Lett. 69, p. 3944 (1996).

T.E. Schafer, M. Viani, D.A. Walters, B. Drake, E. Runage, J.P. Cleveland, M.A. Wendman and P.K. Hansma, "An Atomic Force Microscope for Small Cantilevers", SPIE vol. 3009, p. 48–52 (1997).

D.A. Walters, M. Viani, G. Paloczi, T.E. Schaffer, J. P. Cleveland, M.A. Wendman, G. Gurley, V. Elings and P.K. Hansma, "Atomic Force Microscopy Using Small Cantilevers", SPIE vol. 3009, p. 48–47 (1997).

P.K. Hansma, D. Drake, D. Grigg, C.B. Prater, F. Yashar, G. Gurley, V. Elings, S. Feinstein and R. Lal, "A New Optical –Lever Based Atomic Force Microscope" J. Appl. Phys. 76, 796 (1994).

T.E. Schaffer, J.P. Cleveland, F. Ohnesorge, D.A. Walters and P.K. Hansma, "Studies of Vibrating Atomic Force Microscope Cantilevers in Liquid", J. Appl. Phys. 80, 3622 (1996).

* cited by examiner

SUMMING THE OUTPUT OF AN ARRAY OF OPTICAL DETECTOR SEGMENTS IN AN ATOMIC FORCE MICROSCOPE

CROSS-REFERENCE TO RELATED APPLICATIONS

This application is a division of application Ser. No. 09/166,979, filed Oct. 6, 1998.

STATEMENT REGARDING FEDERALLY SPONSORED RESEARCH OR DEVELOPMENT

This invention was made with Government support under Grant (or Contract) No. DMR9622169, awarded by the National Science Foundation. The government has certain rights in this invention.

BACKGROUND OF THE INVENTION

An atomic force microscope (AFM) is a deflection detection optical device in which, in a common implementation, forces are measured by means of a cantilever that deflects when forces act on it. The deflection of the cantilever is sensed by a detection system, commonly by focusing an incident beam as a spot onto a cantilever and directing the reflected beam onto a segmented detector. Conventionally, a two-segment detector, such as a split photodiode, is used. Whereas, only two segments are usually used to sense either vertical or horizontal cantilever deflections, the photo diode can have four segments for measuring cantilever deflections in both directions. Initially the beam spot must be positioned so as to be approximately equally incident on each of the segments. The deflection of the cantilever is detected as a difference between the incident powers on each segment.

In the approximately twelve years since its invention, the AFM has become more and more advanced, measuring smaller and smaller forces and utilizing smaller and smaller cantilevers. This has introduced problems relating to forming appropriate incident light beam spots on such very small cantilevers and in detecting cantilever deflection during scanning as well as when different cantilevers are brought into position for different uses.

In addition, a fundamental limit is the source of noise in the AFM, generally resulting from thermal noise of the cantilever. With the use of smaller cantilevers, this noise source can be reduced such that very small forces can be measured in principle. However, with smaller forces, the deflections of the cantilever become smaller and the detection noise becomes more and more significant. Therefore, it is important to have a reliable, low-noise detection system.

BRIEF SUMMARY OF THE INVENTION

The present invention provides a high sensitivity deflection detection device that uses a light spot, with improvements to reduce detection noise and thermal drift and allow for higher signal-to-noise ratios of measurements of the beam deflection. Such a device is illustrated by an atomic force microscope. The invention provides improvements involving the incident beam as well as a detection system. In particular, a high sensitivity atomic force microscope is provided including one or more of the following: means in the path of the incident beam for adjusting the size, shape and/or power of the incident beam spot, means for moving the incident beam spot with movement of the cantilever whereby to maintain the position of the spot on the cantilever, means for reducing the signal to noise ratio of the optical detector in which different gains are applied to different segments of the optical detector, and means for regulating the temperature of the environment of the atomic force microscope to limit thermal drift. The invention incorporates a variety of strategies that individually, and in particular in combination, provide higher sensitivity to the atomic force microscope.

To adjust the size of the incident beam spot, one can place zoom optics in the path of the incident beam having a plurality of lenses chosen and arranged to provide an adjustable focal length. This can be combined with a viewing system that is confocal with the beam spot on the cantilever. One can selectively place one of a plurality of cantilevers in the path of the incident beam and, by placing a selected cylindrical lens in the light path, one can fit the spot to the selected cantilever.

With collimated light, one can place an adjustable beam expander in the path of the incident beam, the expander having at least one lens that diverges or converges the collimated light, and at least one lens that re-collimates the diverged or conversed light beam to a different size beam. Alternatively, when using a plurality of cantilevers, a removable and interchangeable lens can be placed at a distance from each particular cantilever to produce different size focus spots for respective selected cantilevers.

To adjust the power of the incident beam spot, a mask of variable optical transmittance can be inserted in the path of the incident beam, preferably in an image plane with respect to the plane of the cantilever. The mask may be patterned to produce a desired irradiance distribution of the incident beam spot on the cantilever.

Other aspects of the invention provide control means for moving the incident beam spot with movement of the cantilever to maintain the position of the spot on the cantilever. In particular, a change in position of the cantilever is determined which is compared to the position of the spot and the position of the spot is then adjusted until it corresponds to the position of the cantilever.

Detection noise is reduced by providing the segments of the optical detector with different gains optimized to maximize the signal to noise ratio of the particular measurement. The segments are arranged in an array, in a particular embodiment as the component of a CCD chip. A plurality of pre-amplifiers are associated with respective segments, and summing means are provided to receive the pre-amplified outputs of the segments. In one embodiment, the different gains are applied to the respective pre-amplifiers. In another embodiment, the different gains are applied to the summing means.

Thermal drift of the instrument is limited by regulating the temperature of the environment, specifically by closing the atomic force microscope in a housing.

BRIEF DESCRIPTION OF THE DRAWINGS

The following briefly describes each of the drawings, in which components are generally schematic and in some cases greatly exaggerated for clarity of illustration.

DETAILED DESCRIPTION OF THE INVENTION

Figure 1:
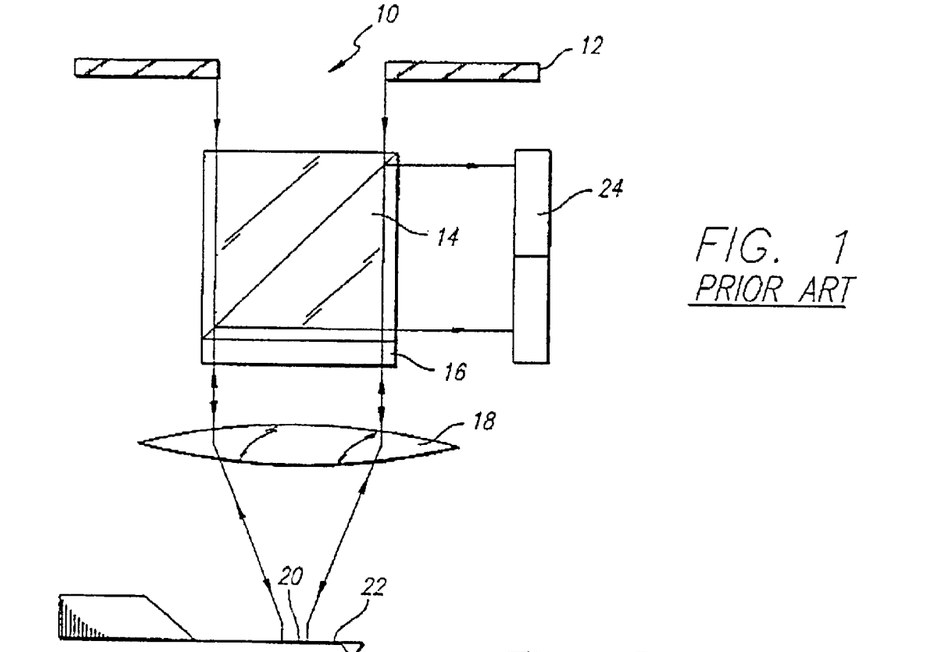
FIG. 1 is a simplified schematic drawing of a prior art AFM.

Referring to FIG. 1, an AFM as known to the prior art is schematically illustrated, wherein an incident light beam 10, which may be collimated, from a source not shown, is projected through an aperture 12, a polarizing beamsplitter 14, a quarter-wave plate 16, and a focusing lens system 18 to form a spot 20 on a cantilever 22 of the AFM. Light is reflected back from the cantilever 22 through the focusing lens system 18 and quarterwave plate 16 to reflect from the polarizing beamsplitter 14 onto a segmented photodetector 24. Prior to the measurement, the reflected beam is centered on the segmented photodiode so that substantially equal amounts of light power falls on one segment as on the other. Thereafter, as the cantilever moves up and down, more or less of the light beam will fall on one or the other of the segments providing a signal tracking the height of the cantilever.

Previous work has shown that the size of the focused spot on the cantilever in an AFM affects the signal to noise ratio of the cantilever deflection system and that the signal to noise ratio of the detection system is maximized when the focused spot approximately fills the cantilever. An AFM designed for use with different size cantilevers needs to be capable of producing different size focused spots in order to use each cantilever at its maximum detection signal to noise ratio. A previous AFM developed by the inventors included an adjustable aperture in the incident beam path to change the focused spot size on the cantilever. The diameter, w, of the focused spot on the cantilever is related to the wavelength, λ, and to the effective numerical aperture, NA, of the incident beam by diffraction theory:

$$w \sim \frac{\lambda}{NA} \quad (1)$$

where a is the diameter of the incident beam and f is the focal length of the lens/lens system. Therefore, a small aperture width decreases the incident beam diameter and thus increases the focused spot diameter on the cantilever.

$$w \sim \frac{\lambda f}{a}, \quad (2)$$

Figure 2:
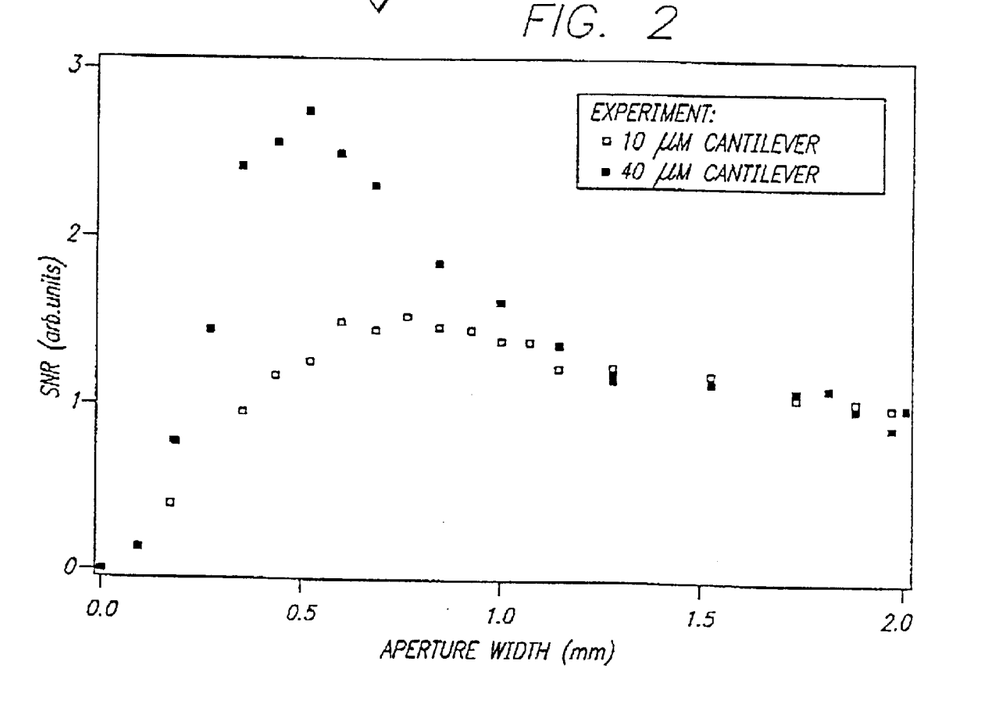
FIG. 2 displays the signal to noise ratio of a set cantilever deflection as a function of the width of the aperture in a prior art AFM with a 10 micrometer cantilever and a 40 micrometer cantilever.

The measured signal to noise ratio of a set cantilever deflection for 10 μm and 40 μm cantilevers is displayed in FIG. 2 as a function of the aperture width. The signal to noise ratio with the 40 μm cantilever is about 3 times higher at an aperture width of a≡0.5 mm than it is at full aperture. This is due to the fact that the focused spot size matches the cantilever size better at a≡0.5 mm than it does at full aperture width.

One disadvantage of an adjustable aperture is that light power is cut out from the incident beam and lost for the detection of the cantilever deflection. This lowers the sensitivity of the detection. In accordance with one embodiment of the invention, shown in FIGS. 3(A) and 3(B), the incident beam size is reduced without significantly reducing the incident beam power by placing a beam expander in the incident beam path. A beam expander is a lens system that first diverges or converges a collimated input beam and then re-collimates it to a different size output beam.

Figures 3A, 3B, 3C:
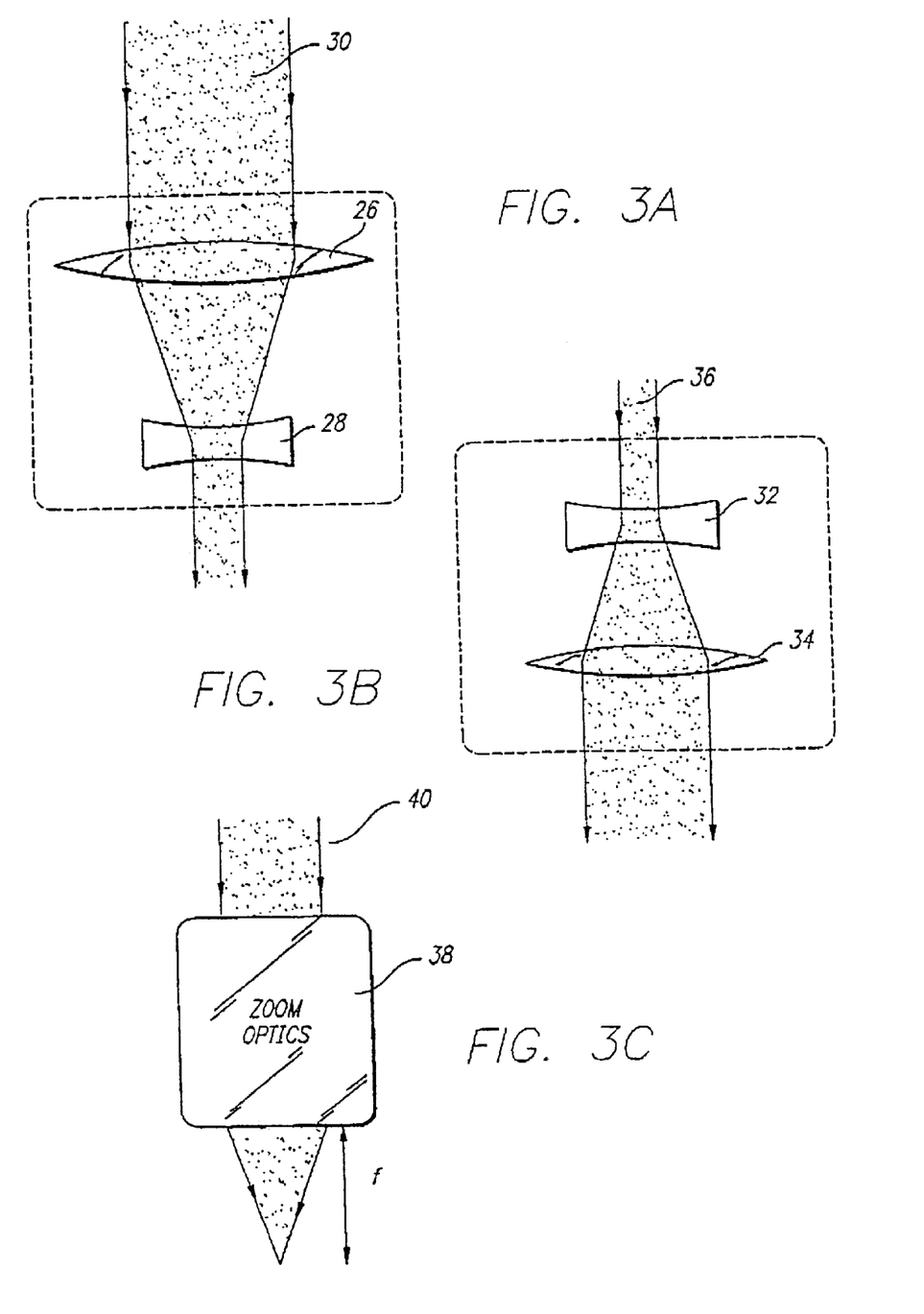
FIG. 3 schematically illustrates the insertion of various optics in the incident beam path: (A) a converging beam expander and recollimater, (B) a diverging beam expander and recollimater, and (C) zoom optics.

In FIG. 3(A) a converging lens 26 is combined with a diverging lens 28, acting as a re-collimating lens, to reduce the diameter of the incident beam 30. In FIG. 3(B) a diverging lens 32 is combined with a converging lens 34 acting as a re-collimator to increase the diameter of the incident beam 36.

Alternatively, as shown in FIG. 3(C), zoom optics 38 can be used as part of the focusing lens system. Zoom optics are constituted by a lens system that has an adjustable focal length. Using the same input beam 40, different size focused spots can be produced according to equation (2). Zoom optics do not necessarily require a collimated input beam.

Figures 4A, 4B:
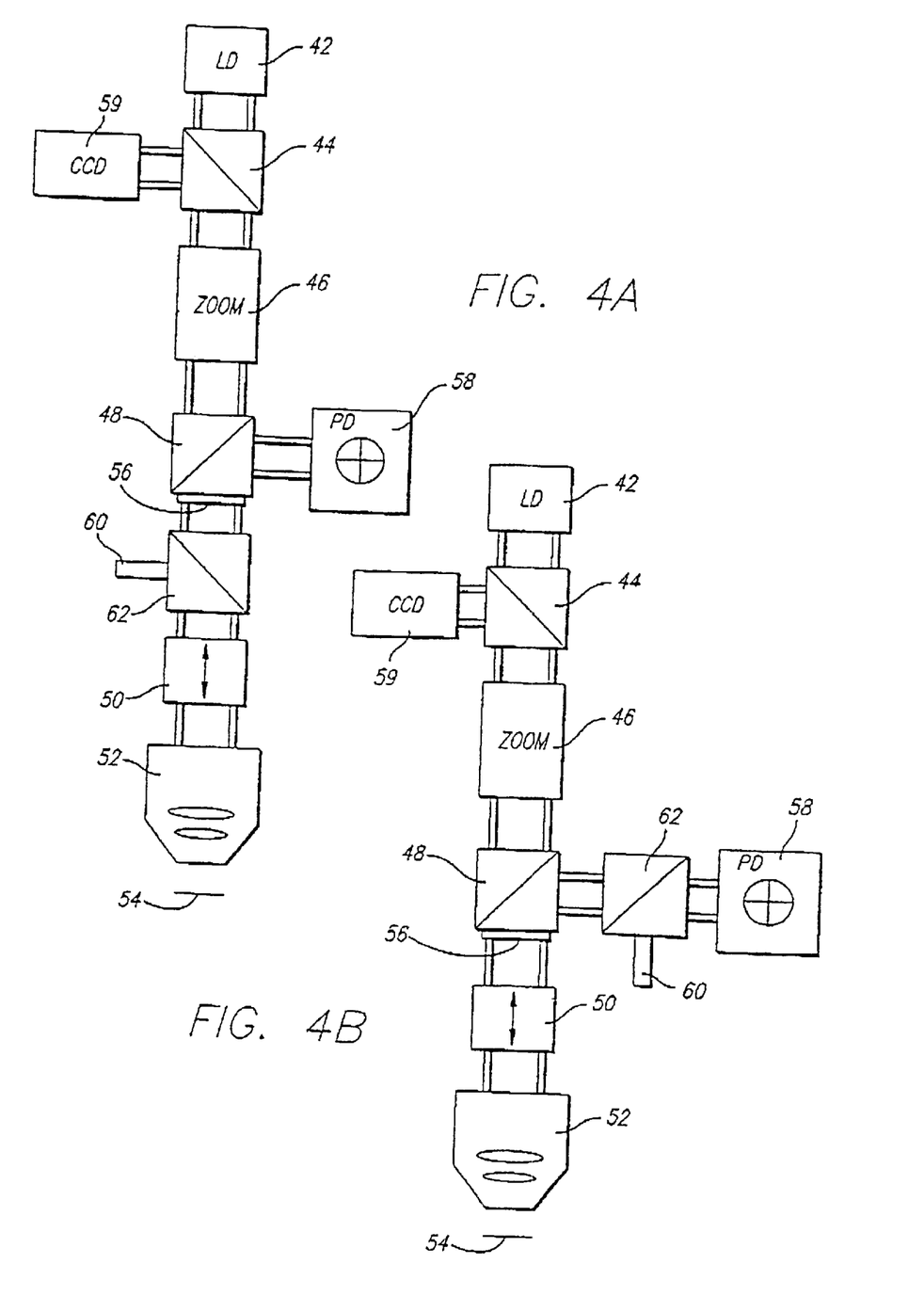
FIGS. 4(A) through (D) depict various configurations for zoom optics usable in the invention.
Figures 4C, 4D:
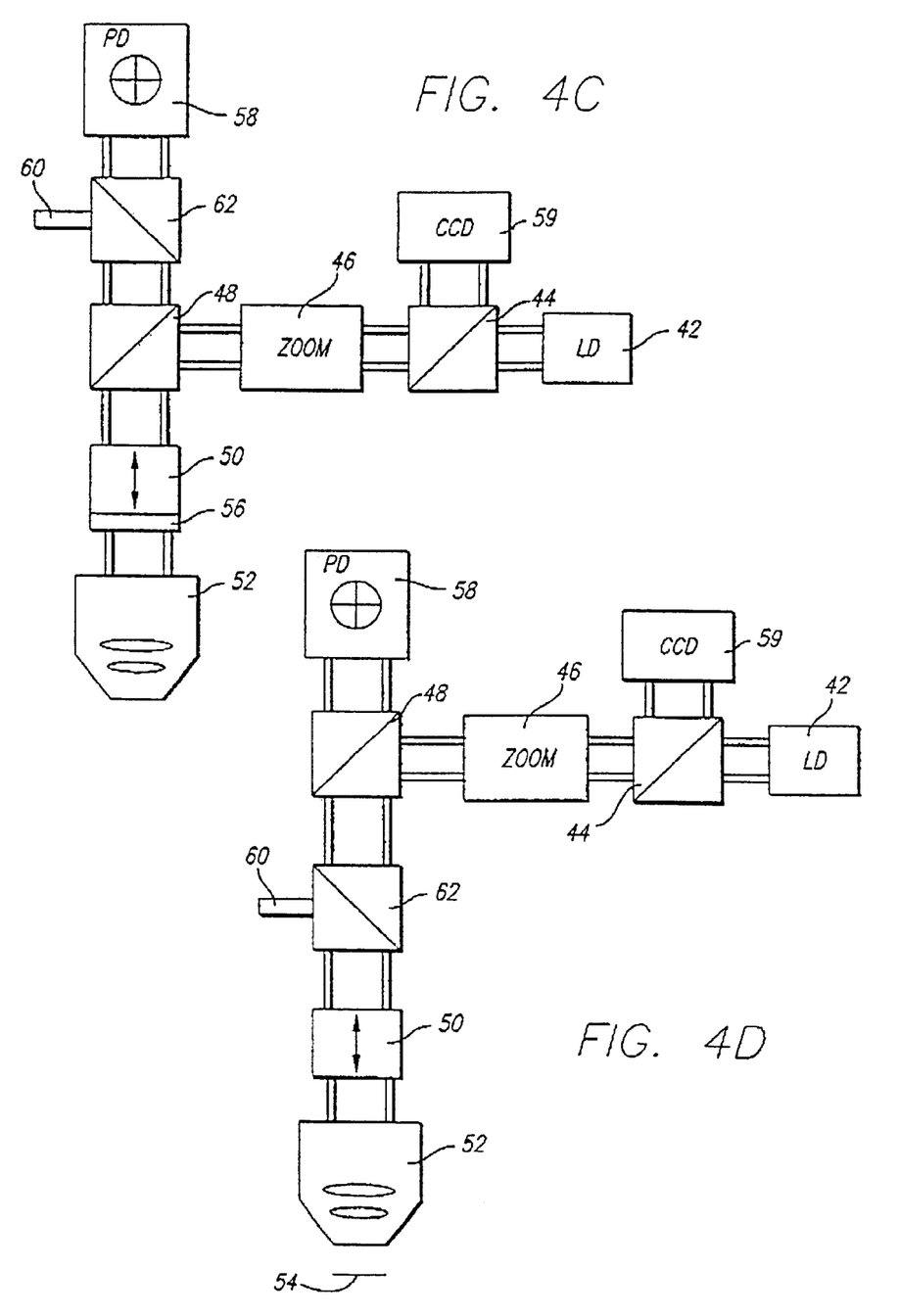

In a particular embodiment, the zoom optics would be common to the laser beam path and to a viewing system that is confocal with the laser beam. FIGS. 4(A) through (D) illustrate variations on an AFM with zoom optics in which light from a laser diode 42 is projected successively through a beamsplitting plate 44, zoom optics 46, a polarizing beamsplitter 48, a focusing system SO and an objective 52 to form an incident beam spot on a cantilever 54. In one of the embodiments, in FIG. 4(C), a quarterwave plate 56 is interposed between the focusing system 50 and objective 52. In other embodiments, it is placed just below the beam splitter 48. After being reflected from the cantilever 54, the reflected beam travels back through the objective 52, focusing system 50, polarizing beamsplitter 48 and quarterwave plate 56 (in the order of its placement) to impinge on a photodiode detector 58. In FIGS. 4(A) and 4(B), light from the laser diode goes in a straight line through the polarizing beamsplitter and is reflected on the beamsplitter on the return path to the photodiode detector 58. In FIGS. 4(C) and 4(D), light from the laser diode is reflected by the polarizing beamsplitter 48 onto the cantilever 54 and the return beam travels directly through the polarizing beamsplitter 48 to the photodiode detector 58. In each of the embodiments, reflected light traveling back through the zoom optics 46 is reflected by the beamsplitting plate 44 onto a CCD 59 for confocal observation of the cantilever 54. The cantilever is illuminated by means of a source of illumination 60 and beamsplitting plate 62 located below the zoom optics 46 in FIGS. 4(A), (B) and (D) and above the zoom optics in FIG. 4(C).

The zoom optics can be set up so that adjustments to it would chance the cantilever's magnification in the viewing system but would not de-focus the cantilever in the viewing system. Since the zoom optics is common to both laser beam path and viewing system path, the focused spot changes size, too, but the apparent size of the focused spot in the viewing system stays constant. Zoom optics also allows the user to zoom out to have a large field of view. The user could then zoom in on the cantilever of interest and bring it to a pre-set size in the viewing system, to automatically fit the focused spot in size to the cantilever. This size is set by the size of the focused spot in the viewing system (which is constant).

Figure 5A:
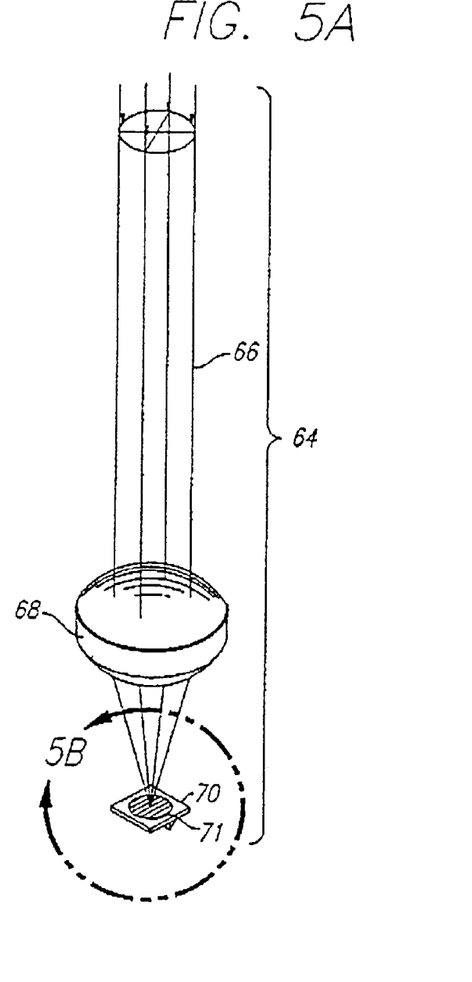
FIG. 5 depicts the use of cylindrical lenses with cantilevers of different length/width aspect ratios.
Figure 5B:
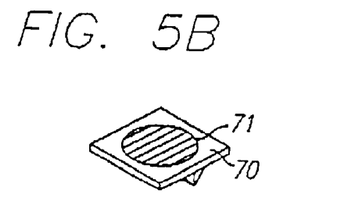
Figure 5C:
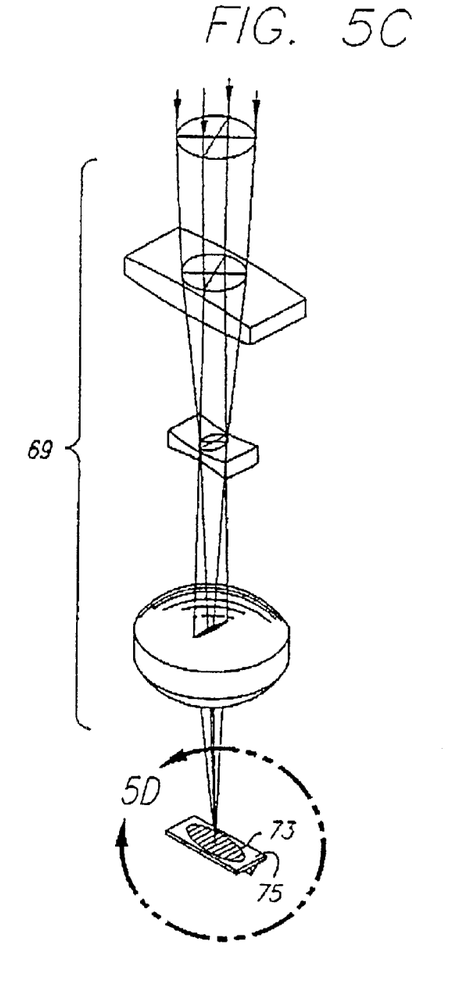
Figure 5D:
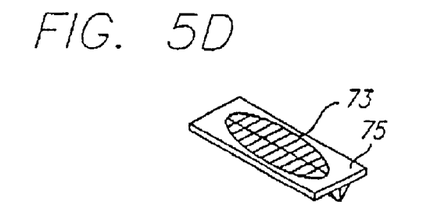

Optionally, one can allow for different magnifications in the directions along and across the cantilever with the help of cylindrical lenses or prisms to be able to fit the focused spot optimally to a range of cantilevers with different length/width aspect ratios. In effect, the arrangement is a one-dimensional beam expander, adjustable by moving the lenses. Referring to FIGS. 5(A) and (B), a simple lens 68 is used to focus a circular incident beam 66 onto a cantilever 70. This produces a circularly shaped spot 71, as shown in FIG. 5(B). To produce an elongated oval spot 73, as shown in FIG. 5(D), the cylindrical lens (or lenses) 69 are used as a one dimensional beam expander, to increase the spot length along the lengthwise direction of the cantilever 75. This enables greater sensitivity of detection.

Figure 6A:
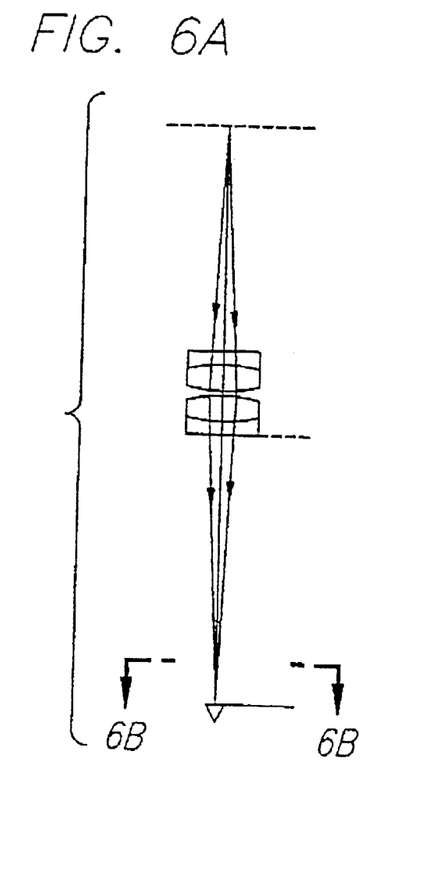
FIG. 6 depicts various configurations for a removable and interchangeable lower moving lens system and the focused spots associated therewith including: in 6A a depiction of a system not including the lower lens system of this invention and in 6B the spot therefore; and in 6C, 6E, and 6G, a lower lens moving systems of this invention and in 6D, 6F and 6H associated spots.
Figure 6B:
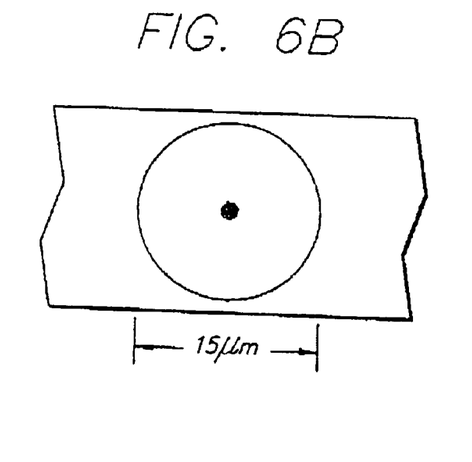
Figures 6C, 6D:
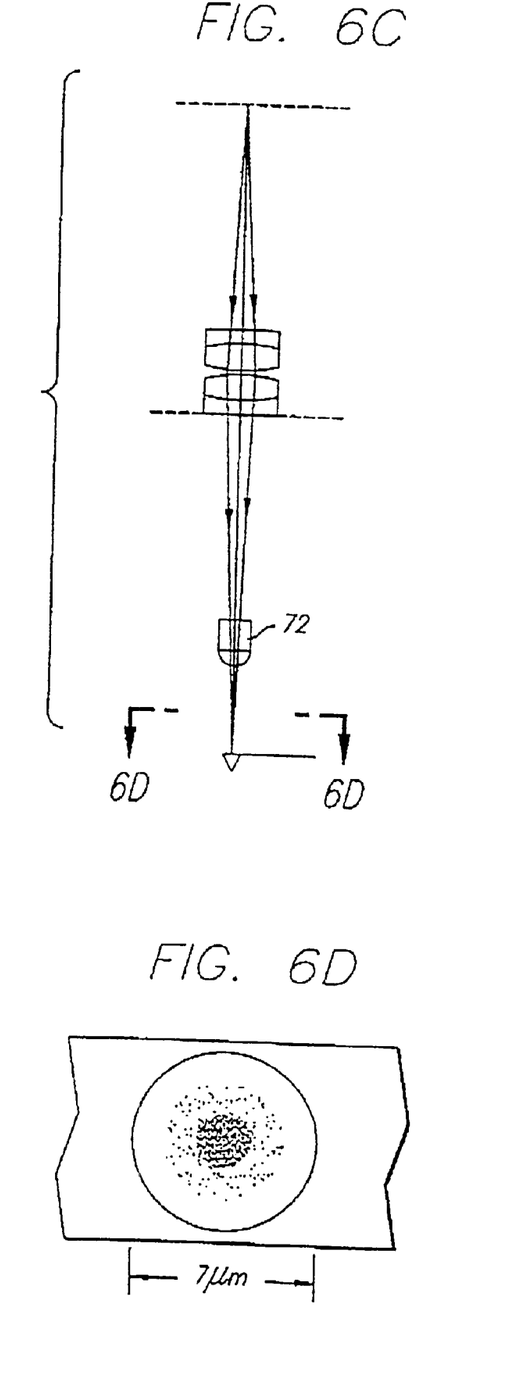
Figure 6E:
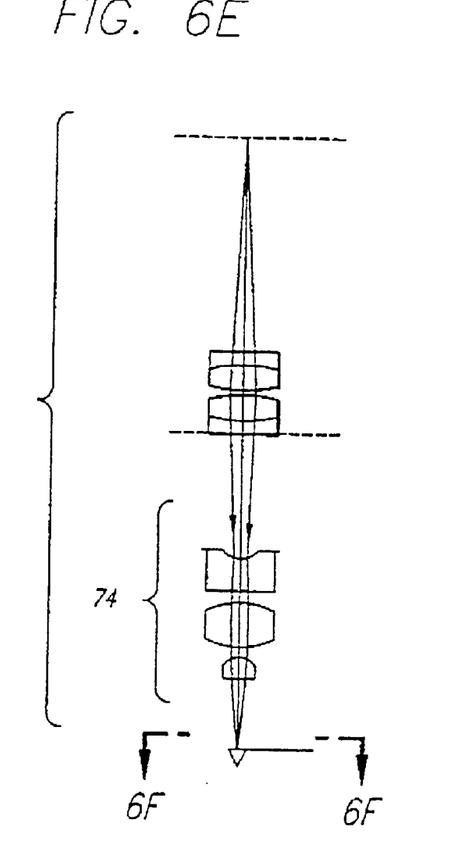
Figure 6F:
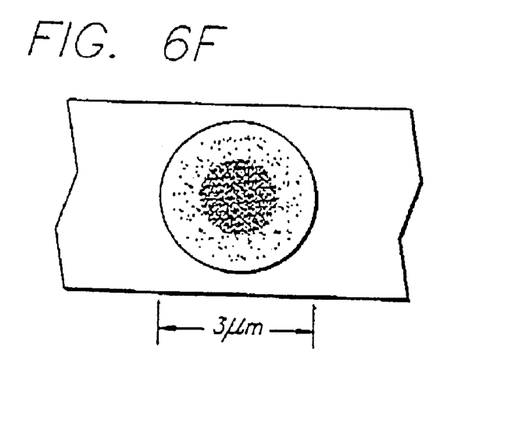
Figure 6G:
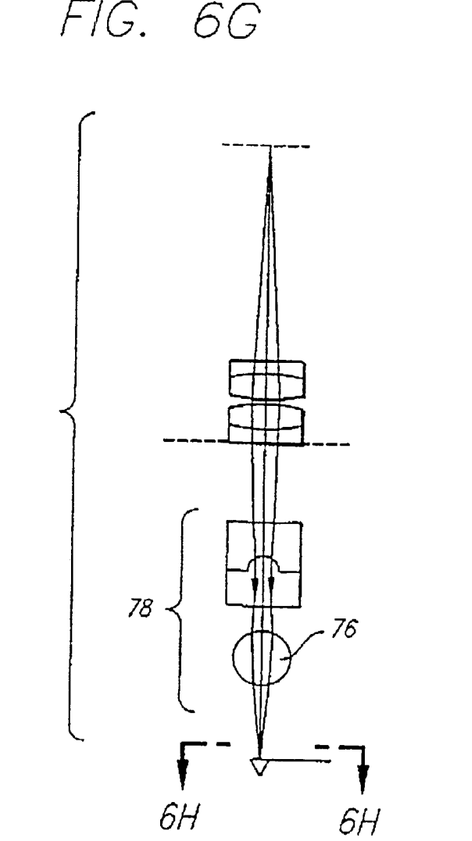
Figure 6H:
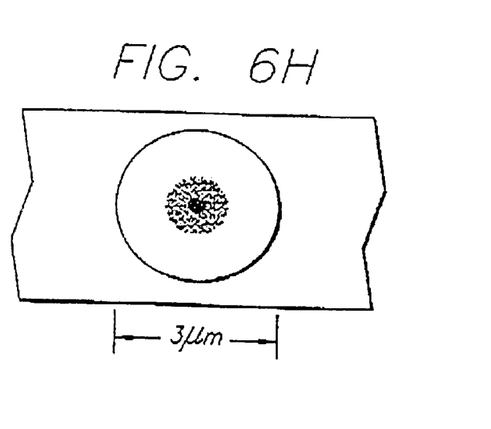

Adjustments of the size of the incident beam and/or of the focal length of the lens system can be continuous or discrete. To implement discrete adjustments of the focused spot size, a removable focusing element and/or removable beam expander is placed in the incident beam path. Preferably, different lenses are mounted into different removable cantilever modules providing different focused spot sizes for use with different size cantilevers. Removable, interchangeable focusing elements can be used to enable a scanning cantilever AFM to be used with small cantilevers. The total track length of the optics is fixed and pre-set such that the focused spot tracks the cantilever with the help of an upper moving lens system. To produce different size focused spots for use with different size cantilevers in the same scanning cantilever AFM, a lower moving lens system is provided that is removable and interchangeable. One can use a ray-tracing computer simulation program to design replaceable lower lens systems that have different focused spot sizes at a constant distance between the cantilever and the upper lens system. Referring to FIGS. 6(A) and (B), with no lower lens system, the focused spot diameter is diffraction limited to about 15 μm. With various lower lens systems, focused spot diameters of 3 μm or smaller can be achieved. In FIGS. 6(C) and (D), a cylindrical lens system 72 is used. In FIGS. 6(E) and (G), different lens systems 74 and 76 are used, the lens system 78 of FIG. 6(G) including a ball lens 76. FIGS. 6(F) and (H) are corresponding spots.

Figure 7:
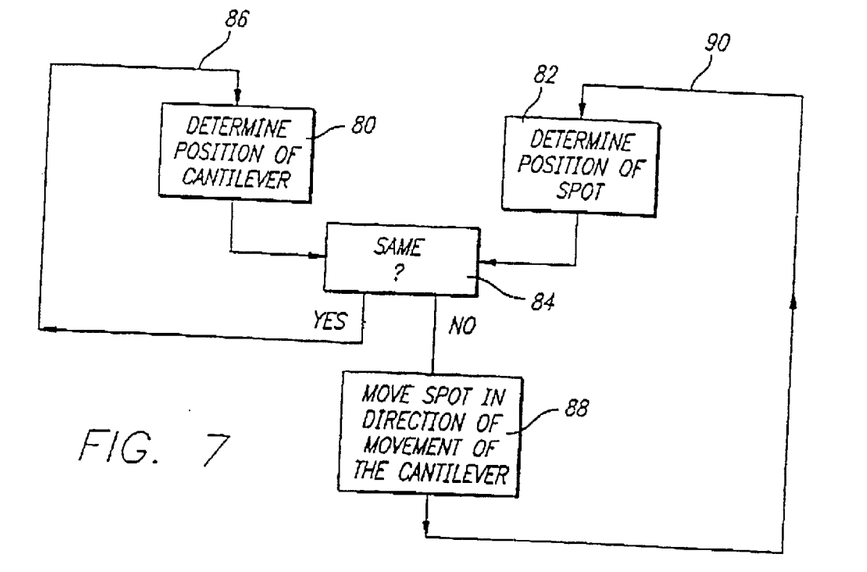
FIG. 7 schematically depicts a feed-back system for keeping the incident spot optimized in a scanning cantilever microscope.

In a further embodiment of the invention, the position of the cantilever and/or the focused spot in the viewing system is monitored to provide input to a feedback system that keeps the spot on the cantilever even when the cantilever moves, as in a scanning cantilever microscope. Such a feedback system is shown in FIG. 7. The position of the cantilever is determined at 80 and the position of the spot on the cantilever is determined at 82. These are compared at 84 and if they are the same, the position of the cantilever is again compared. This repeats, as shown at 86, until a comparison indicates that the position of the cantilever is not the same as the position of the spot. In that case, the spot is moved in the direction of movement of the cantilever, as indicated at 88, whereupon the position of the spot is redetermined, as indicated at 90, and the cycle repeats.

Figure 8A:
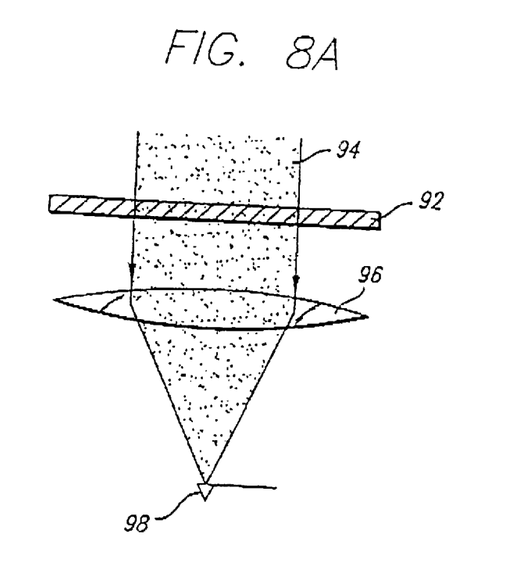
FIG. 8 schematically depicts a variable density mask in (A) the incident beam and in (B) in the image plane of the incident beam.

Using a beam expander or zoom optics as described above is advantageous when one can use all of the available laser power in order to maximize the signal with respect to the shot noise. There is an upper limit, however, to the usable laser power on the cantilever, since the laser light heats up the cantilever. In the case of thin (<≈100 nm) metal cantilevers, this heating can cause softening of the metal and subsequent irreversible curling of the cantilever. Therefore, the total laser power on the cantilever is limited. In accordance with another embodiment of this invention, the optical beam deflection sensitivity and the heat-conducting properties of the cantilever are taken into account in tailoring an optimum focused spot shape with an irradiance distribution $I_c(p,q)$, where p and q are coordinates in the cantilever plane. The required irradiance distribution (power per unit area) of the incident beam, $I_i(p,q)$, in order to produce $I_c(p,q)$ on the cantilever, can be calculated by diffraction theory:

$$I_i(x, y) = \frac{\alpha}{\lambda^2 f^2} \left| \int_{cantilever} \int dp\, dq \sqrt{I_c(p, q)}\, e^{-2\pi i/\lambda f (px+qy)} \right|^2, \quad (3)$$

where λ is the wavelength of the light, f is the focal length of the lens system, α is a loss factor due to absorption and stray reflection in the lens system, p and q are coordinates in the cantilever plane and x and y are coordinates in the aperture plane. In accordance with this embodiment, and referring to FIG. 8(A), to produce this optimum irradiance distribution of the incident beam 94, a mask 92 of variable optical transmittance T(x, y) is inserted in the path of the incident beam. This mask can be made, for example, from a liquid crystal device or from an optical filter. The mask can be patterned such that it produces the desired irradiance distribution $I_i(x, y)$ of an appropriately intense and large incident beam that in return produces, through the lens system 96, the desired focused spot irradiance distribution on the cantilever 98.

Figure 8B:
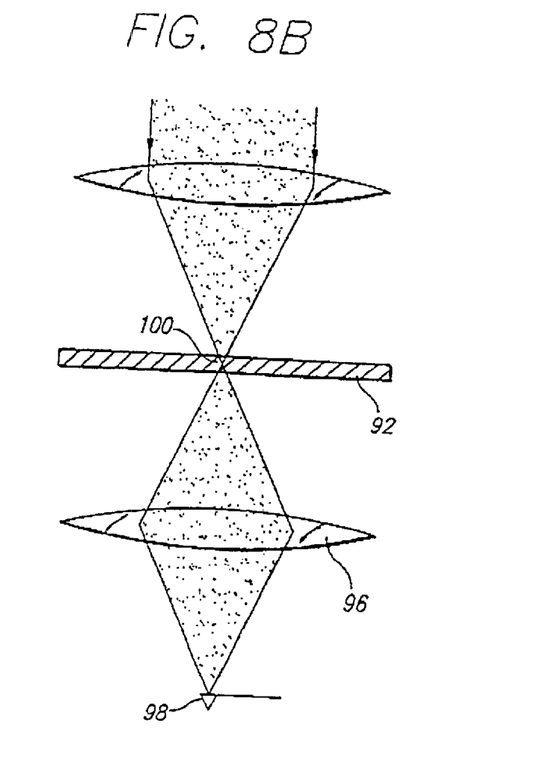

In another embodiment, shown in FIG. 8(B), an alternate implementation is obtained by creating an image plane 100 with respect to the cantilever plane. By placing the variable density mask 92 in this image plane 100, an image of this mask is projected through the lens system 96, onto the cantilever 98. Therefore, by utilizing this embodiment of the invention, the design of a mask that produces a desired focused spot shape on the cantilever becomes especially easy. To produce an irradiance distribution $I_c(p, q)$ on the cantilever, the optical transmittance T(x, y) of the mask must be:

$$T(x, y) = \frac{I_c(mx, my)}{I_o(x, y)}, \quad (4)$$

where $I_o(x, y)$ is the irradiance distribution of the light incident on the mask and m is the magnification of the lower lens system and $I_o(x, y) \geq I_c(mx, my)$ for all x, y. In such an arrangement it can be particularly easy to produce multiple focused spots at different locations on the cantilever or on different, neighboring cantilevers. Also, a variable density mask can be used in conjunction with adjustable beam expander or zoom optics to produce an optimum focused spot on the cantilever.

Figure 9:
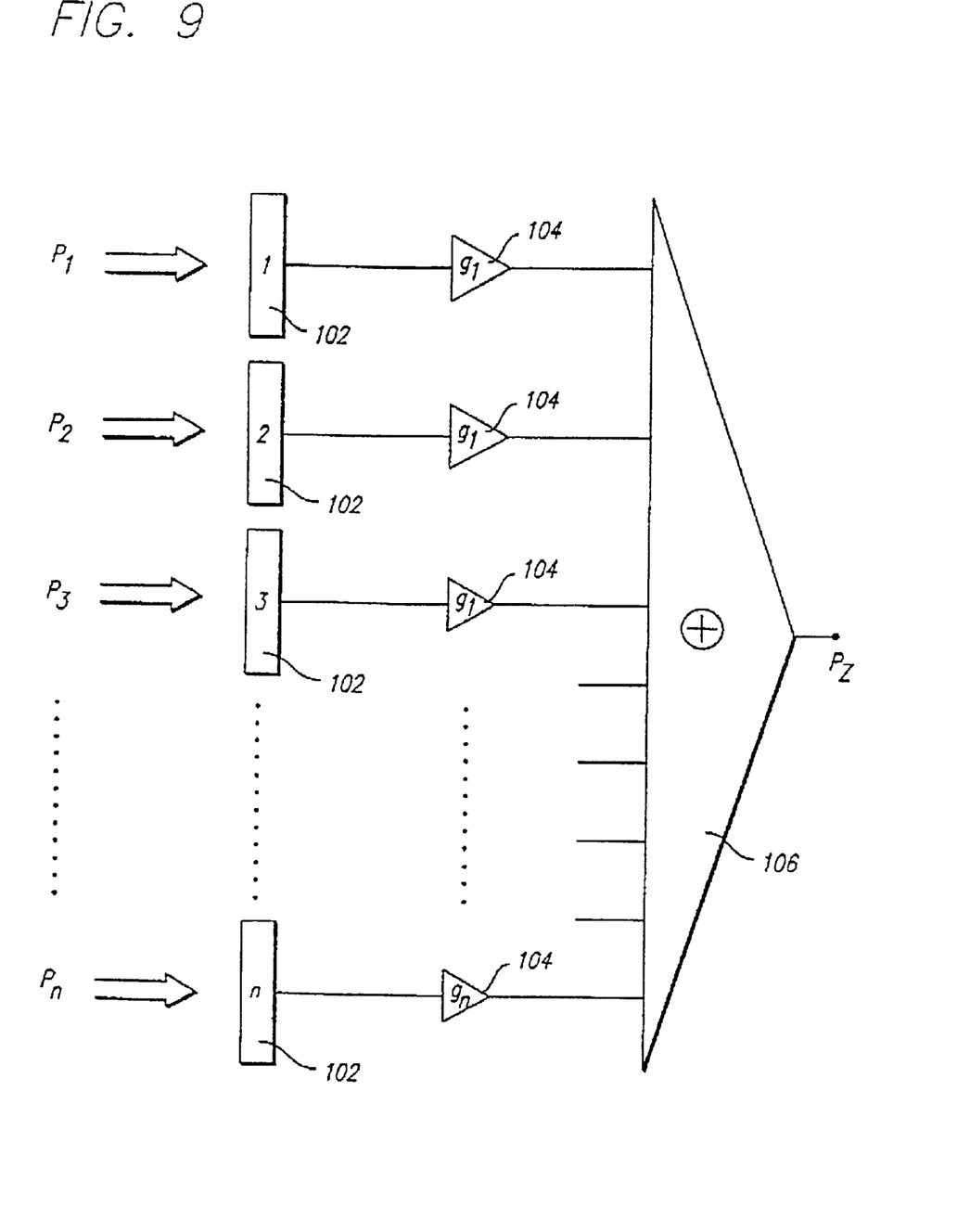
FIG. 9 schematically depicts a mufti-element detector utilizing assigned gains.

In another embodiment of the invention, shown in FIG. 9, the signal to noise ratio of the optical detector can be markedly improved by using an array of n detector segments 102, where n is three or more and each segment 102 can be assigned an individual gain factor. For an undeflected cantilever, the power $P_i$ is incident on the i'th detector segment and measured. All $P_i$ are weighted by the gain factors $g_i$ and added together:

$$P_{z=0} = \sum_{i=1}^{n} g_i P_i, \quad (5)$$

When the cantilever tip is deflected vertically by the distance z, the incident powers $P_i$ change due to motion of the spot on the detector:

$$P_i \rightarrow P_i + \Delta P_i, \quad (6)$$

where $\Delta P_i$, is the change in the power on each segment. The weighted sum now becomes:

$$P_{z=0} = \sum_{i=1}^{n} g_i(P_i + \Delta P_i) = \sum_{i=1}^{n} g_i P_i + \sum_{i=1}^{n} g_i \Delta P_i. \quad (7)$$

The first sum in eq.(7) is a constant and can be subtracted off. Thus we get for the signal of the measurement of the cantilever's deflection:

$$P_z^S = \sum_{i=1}^{n} g_i \Delta P_i. \quad (8)$$

Physically, the limiting noise in the measurement of $P_i$ is the shot noise due to the quantum nature of light:

$$P_i^N = \gamma \sqrt{P_i}, \quad (9)$$

where $\gamma$ is a factor dependent on the wavelength of the light and on the bandwidth of the measurement. We will neglect $\gamma$ in the following analysis. The $P_i^N$ of each element is weighted and added together. But since the noise fluctuations of the different segments are incoherent, they add in quadrature:

$$P^N = \sqrt{\sum_{i=1}^{n} g_i^2 P_i}. \quad (10)$$

Here we assume that $\Delta P_i \ll P_i$ and that it is thus sufficient to neglect the $\Delta P_i$ in the noise. Using (8) and (10), we can write for the signal-to-noise ratio of the measurement:

$$SNR = \frac{P_z^S}{P^N} = \frac{\sum_{i=1}^{n} g_i \Delta P_i}{\sqrt{\sum_{i=1}^{n} g_i^2 P_i}} \quad (11)$$

The goal now is to choose the n gains, $g_i$, that maximize the signal to noise ratio. There are n simultaneous conditions:

$$\frac{\partial SNR}{\partial g_j} = 0 \quad (12)$$

that lead to $$g_j = c \Delta \frac{P_j}{P_j}, \quad (13)$$

where c is an arbitrary positive constant. Therefore, if the $g_i$ are chosen according to eq. (13), the signal to noise ratio will be maximized in the case of shot noise. The constant c can be chosen to restrict the range of the gains to $-1 \leq g_1 < 1$ by setting c equal to the inverse of the largest element of the set of the absolute values of the gains: $c = 1/\max\{g_j\}$. These n gains could be assigned to the n pre-amplifiers 104 remotely, for example by means of analog switches or digital to analog converters. Once the gains are set, the optimized deflection signal is present at the output of the summing stage 106 and can be used for feedback just like the deflection signal in a 2-segment detector. By such means, the signal to noise ratio of the optical detector can be improved. The addition of the signals from at least three segments detects a change of position or shape of the spot as the reflected beam traverses three or more segments. "Traverse" is meant to include not only completely crossing the segment but also partially crossing it.

It is also possible to have different electronic setups, for example one could include the wins in the summing stage.

The following example demonstrates that a mufti-segment detector is of advantage over a two-segment detector.

EXAMPLE

Figure 10A:
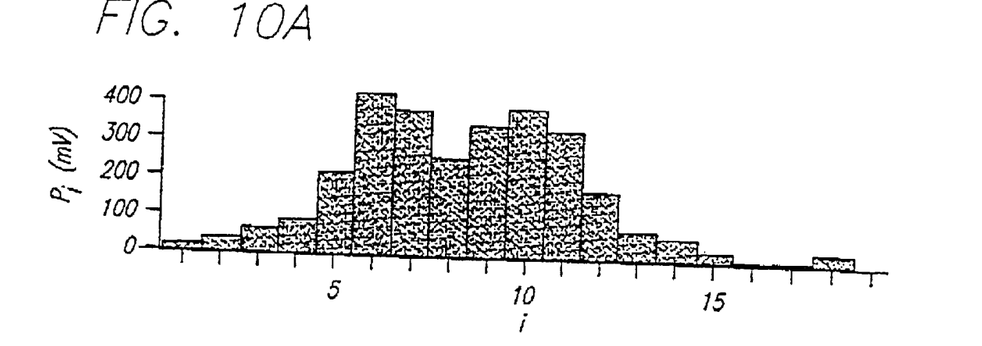
FIG. 10 depicts the (A) power distribution, (B) change in power of a nineteen element array detector, (C) simulation of a two-segment detector, and (D) gains for the optimized signal to noise ratio of the detector.
Figure 10B:
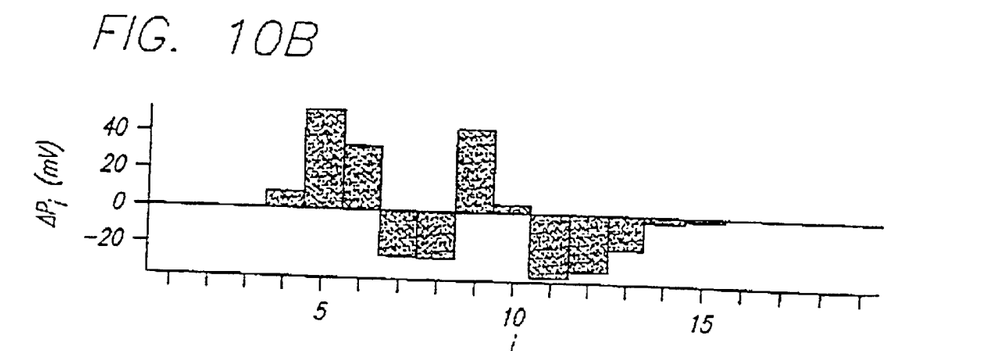

A home-made, prototype AFM was used to focus an incident beam onto a cantilever and the reflected beam was directed onto a detector. The cantilever was periodically deflected by vibrating it at its resonance frequency. To simulate a 19-element array detector, a slit-aperture was moved through the spot at the detector and $P_i$ and $\Delta P_i$ were measured at each position of the aperture that would represent an array element. $\Delta P_i$ was measured at maximum positive deflection of the cantilever. The result is displayed in FIGS. 10(A) and (B). The power distribution in FIG. 10(A) represents the shape of the spot at the detector (the scale of $\Delta P_i$ in FIG. 10(B) is much smaller than that of $P_i$ in FIG. 10(A)). The gains $g_i$ were then chosen according to equation (13) with C=0.235: $(g_1, g_2, \ldots, g_{19})$=(0, 0, 0, 0.46, 1, 0.35, -.26, -.40, 0.55, 0.05, -.44, -.72, -.95, -.21, -.13, 0, 0, 0, 0) as shown in FIG. 10(D), and used in equation (11), to calculate the signal to noise ratio of the optimized 19-segment detector:

$$SNR_{19} = \frac{166.4}{\sqrt{707.2}} = 6.26. \quad (14)$$

Figure 10C:
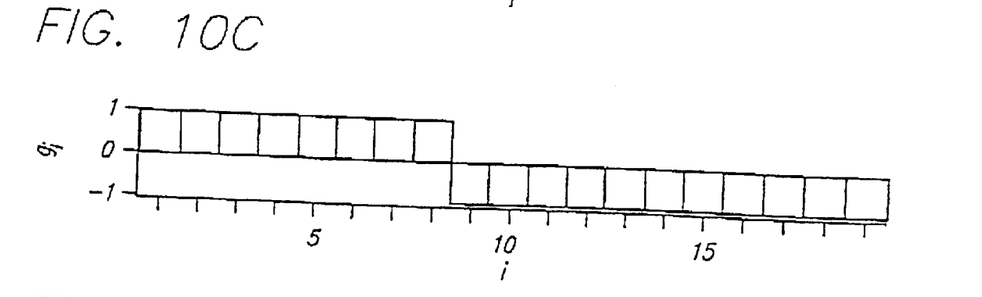
Figure 10D:
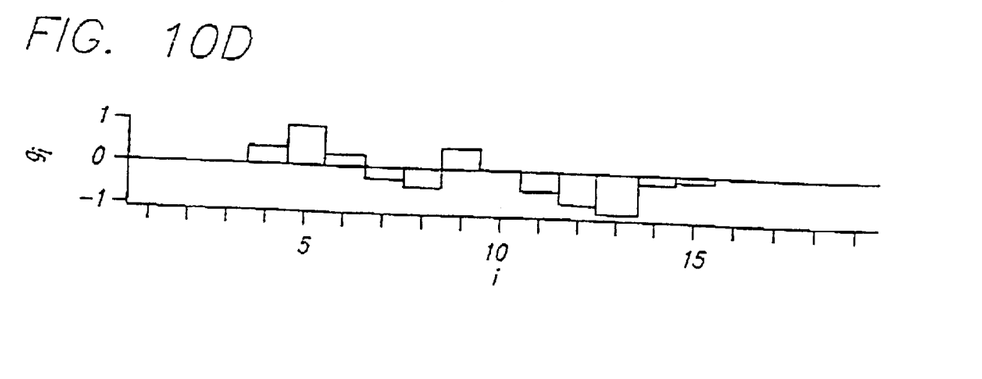

A regular 2-segment detector can be simulated by setting $g_i = 1$ for $i \leq m$ (forming the first segment) and setting $g_i = 1$ for $i > m$ (forming the second segment) as shown in FIG. 10(C). One typically chooses m such that the same power is incident on each of the two "segments". In the example, m=8 and the $g_i$'s are $(g_i, g_2, \ldots, g_{19})$=(1, 1, 1, 1, 1, 1, 1, 1, -1, -1, -1, -1, -1, -1, -1, -1, -1, -1, -1). The signal to noise ratio of the 2-segment detector calculates to $$SNR_2 = \frac{87}{\sqrt{3051}} = 1.58. \quad (15)$$

From equations 14 and (15) it follows that the signal to noise ratio of the optimized 19-segment detector is 4.0 times higher than the signal to noise ratio of a regular 2-segment detector. Also, the usual procedure of centering the spot on a 2-segment detector was eliminated in the case of the mufti-element detector.

In the described case of shot noise, the optimizing $g_i$'s have a particularly simple dependence on the $P_i$ and $\Delta P_i$ (equation (13)). In practice, there may be other noise sources and/or the signal of interest may be defined differently from equation (8). For example, one might want to choose the g; to suppress a spurious signal. Different definitions of signal, noise and the "merit" function that is to be optimized can lead to more complex conditions for the $g_i$ than equation (13). The optimum gains $g_i$ may have to be found numerically in those cases. Also, one can consider other or additional measurements with the individual detector segments before deciding on the values for the $g_i$'s, such as vibrating the cantilever at different normal modes.

In another implementation of using a mufti-element detector with individual gains, a 2-dimensional array of detector elements (a CCD-chip, for example) can be used that further increase the signal to noise ratio or that allow for the detection of additional measurement signals. No constraint need be made to size and shape of the individual elements.

The above optimizing method does not distinguish between an optical beam deflection setup and interferometric setup and therefore can be used interchangeably for both and in particular with a combined optical beam deflection-interferometric setup. Additionally, any signal extracted from the mufti element detector can provide input to a feedback system for regulating certain tasks, such as dynamically optimizing the $g_i$'s (for example to account for drift of the spot on the detector) or even to dynamically adjust the position/size/shape of the focus spot on the cantilever.

We are aware that a four segment detector has often been used to enable an AFM to measure lateral cantilever deflections next to its vertical deflections. Such use of three or more segments per se is not a part of the invention.

Figure 11:
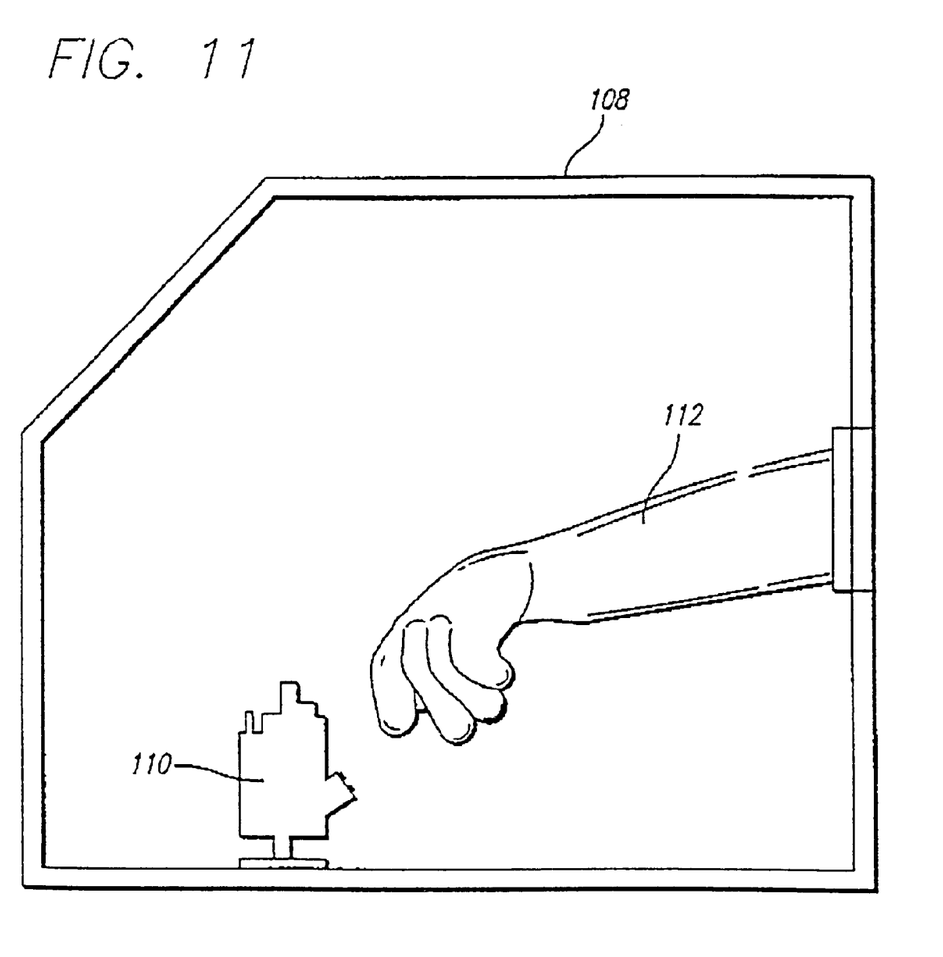
FIG. 11 is a schematic depiction of a housing enclosing the AFM to limit thermal drift.

Referring to FIG. 11, a housing 108 can be provided thermally isolating the AFM 110 and can be equipped, as is common with isolating enclosures with expandable manipulation gloves 112 or, in the alternative, can be operated remotely. By so isolating the AFM, the temperature of the environment of the AFM is regulated, thereby limiting thermal drift.

What is claimed is:

1. A method for operating an optical beam deflection sensing device in an atomic force microscope having one or more cantilevers, a light source providing an incident beam, a lens for focusing the incident beam to a spot on a selected one of said one or more cantilevers, and an optical detector having a linear array of three or more segments for receiving the beam when reflected from the selected cantilever, whereby the addition of the signals from at least three segments detects a change of position or shape of the spot as the reflected beam traverses three or more segments.

2. The method of claim 1 wherein said array is a linear array.

3. The method of claim 1 wherein said pre-selected individual gains are dynamically applied to said signals.

4. The method of claim 1 wherein said method provides an increased signal to noise ratio when compared to an optical detector without said gains.

* * * * *

UNITED STATES PATENT AND TRADEMARK OFFICE
CERTIFICATE OF CORRECTION

PATENT NO. : 6,649,902 B2
DATED : November 18, 2003
INVENTOR(S) : Tilman Schaffer et al.

It is certified that error appears in the above-identified patent and that said Letters Patent is hereby corrected as shown below:

Column 10,
Line 18, delete claim 1 and insert correct claim 1 as follows:

1. A method for operating an optical beam deflection sensing device in an atomic force microscope having one or more cantilevers, a light source providing an incident beam, a lens for focusing the incident beam to a spot on a selected one of said one or more cantilevers, and an optical detector having an array of three or more segments traversed by the beam when reflected from the selected cantilever, the method comprising generating respective signals representing the reflected light beam as it traverses said three or more segments, applying pre-selected individual gains to said signals including one or more gains having a non-zero absolute value smaller than the largest absolute value of the other gains, and summing the signals, to which the gains were applied, from at least three of said segments whereby to detect a change of position, size or shape of the spot as the reflected beam traverses said three or more segments.

Signed and Sealed this

Fourteenth Day of December, 2004

JON W. DUDAS
*Director of the United States Patent and Trademark Office*